United States Patent
Ghose

(10) Patent No.: US 12,524,552 B2
(45) Date of Patent: Jan. 13, 2026

(54) CYBERSECURITY USING FUZZY LOGIC ON ENERGY SIGNATURES AND TIMING SIGNATURES

(71) Applicant: Rockwell Collins, Inc., Cedar Rapids, IA (US)

(72) Inventor: Tanay Ghose, Kolkata (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 79 days.

(21) Appl. No.: 18/583,278

(22) Filed: Feb. 21, 2024

(65) Prior Publication Data

US 2025/0165614 A1    May 22, 2025

(30) Foreign Application Priority Data

Nov. 21, 2023  (IN) .............................. 202311078973

(51) Int. Cl.
*G06F 21/00*   (2013.01)
*G06F 21/57*   (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | |
|---|---|---|---|
| 7,877,621 B2 | 1/2011 | Jacoby et al. | |
| 8,898,049 B2 | 11/2014 | Dhanwada et al. | |
| 9,071,576 B1 * | 6/2015 | Earl | H04L 63/0236 |
| 9,578,093 B1 * | 2/2017 | Gotoh | G06Q 10/0637 |
| 10,185,827 B1 | 1/2019 | Hamlin | |
| 10,423,207 B2 | 9/2019 | Reed et al. | |
| 10,546,130 B1 | 1/2020 | Chaney | |
| 11,074,345 B2 | 7/2021 | Dawson et al. | |
| 11,188,653 B1 | 11/2021 | Hamlin | |

(Continued)

FOREIGN PATENT DOCUMENTS

| | | | |
|---|---|---|---|
| AU | 2001266228 B2 | | 6/2007 |
| CN | 101984640 A | * | 3/2011 |
| WO | 2023148557 A1 | | 8/2023 |

OTHER PUBLICATIONS

European Patent Office, Extended European Search Report received in EP Application No. 24214576.1, Feb. 21, 2025, 8 pages.

(Continued)

*Primary Examiner* — Ghodrat Jamshidi
(74) *Attorney, Agent, or Firm* — Suiter Swantz IP

(57) ABSTRACT

A system and method for identifying compromised systems, even where cyber security measures are in place, continuously monitors system parameters against a set of predefined thresholds. If the system violates those thresholds, either instantaneously or over a period of time, the system determines that unknown processes are using the system; those processes may be unauthorized processes loaded via a successful spoof attack. The system may monitor CPU usage, power usage, temperature, memory access, data storage access, data transmission rates, etc. The system may execute some remedial action when unauthorized processes are suspected.

11 Claims, 6 Drawing Sheets

(56) References Cited

U.S. PATENT DOCUMENTS

| | | | |
|---|---|---|---|
| 11,669,336 B2* | 6/2023 | Lambert | G06F 9/4411 |
| | | | 713/2 |
| 11,777,984 B1* | 10/2023 | Prayaga | H04L 63/1441 |
| | | | 726/23 |
| 2005/0289365 A1* | 12/2005 | Bhandarkar | G06F 1/3287 |
| | | | 713/300 |
| 2008/0276111 A1 | 11/2008 | Jacoby et al. | |
| 2015/0317475 A1 | 11/2015 | Aguayo Gonzalez et al. | |
| 2017/0147422 A1* | 5/2017 | Koktan | G06F 11/0778 |
| 2019/0220703 A1* | 7/2019 | Prakash | G06N 3/09 |
| 2019/0319868 A1* | 10/2019 | Svennebring | H04W 24/08 |
| 2020/0225723 A1* | 7/2020 | Zonensain | G06F 1/28 |
| 2020/0364223 A1* | 11/2020 | Pal | G06F 16/24539 |
| 2020/0364345 A1* | 11/2020 | Hecht | G06F 21/577 |
| 2021/0216377 A1* | 7/2021 | Arlagadda Narasimharaju | |
| | | | G06F 1/3287 |
| 2021/0294893 A1 | 9/2021 | Uddin et al. | |
| 2023/0359744 A1* | 11/2023 | Duggan | G06F 8/65 |

OTHER PUBLICATIONS

Mohan et al., "S3A: secure system simplex architecture for enhanced security and robustness of cyber-physical systems," Proceedings of the 2nd ACM International Conference on High Confidence Networked Systems, Apr. 9, 2013, pp. 65-74.

\* cited by examiner

| x \ y | LED | MED | HED |
|---|---|---|---|
| LUD | LR | LR | HR |
| MUD | MR | MR | HR |
| HUD | MR | HR | HR |

FIG.4

| Rule 1 | LUD (0.6) | MED (0.2) | min(0.6,0.2) = 0.2 |
|---|---|---|---|
| Rule 2 | LUD (0.6) | HED (0.8) | min(0.6,0.8) = 0.2 |
| Rule 3 | MUD (0.4) | MED (0.2) | min(0.4,0.2) = 0.2 |
| Rule 4 | MUD (0.4) | HED (0.8) | min(0.4,0.8) = 0.2 |

FIG.5

CYBERSECURITY USING FUZZY LOGIC ON ENERGY SIGNATURES AND TIMING SIGNATURES

PRIORITY

The present application claims the benefit under 35 U.S.C. § 119(a) of Indian Patent App. No. 202311078973 (filed Nov. 21, 2023), which is incorporated herein by reference.

BACKGROUND

Traditional cyber security measures rely on a challenge-response system based on asymmetric key cryptography. However, these measures can be spoofed if the attacker can determine the secret key, or the response expected by the "challenging" system. If a modified image is loaded onto microcontroller unit or field programmable gate array in a circuit card assembly, it has the potential to execute passive and active attacks.

With passive attacks, code may siphon-off sensitive information. With active attacks, code may actively disrupt the system being controlled (such as an in-flight controller or ground service equipment) by commanding invalid requests to an actuator causing the actuator to fail or compromise the overall system safety.

SUMMARY

In one aspect, embodiments of the inventive concepts disclosed herein are directed to a system and method for identifying compromised systems, even where cyber security measures are in place. A computer system continuously monitors system parameters against a set of predefined thresholds. If the system violates those thresholds, either instantaneously or over a period of time, the system determines that unknown processes are using the system; those processes may be unauthorized processes loaded via a successful spoof attack.

In a further aspect, the system may monitor CPU usage, power usage, temperature, memory access, data storage access, data transmission rates, etc.

In a further aspect, the system may execute some remedial action when unauthorized processes are suspected.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 4 shows a rule table; and

FIG. 5 shows a table of defuzzification.

DETAILED DESCRIPTION

Figure 1:
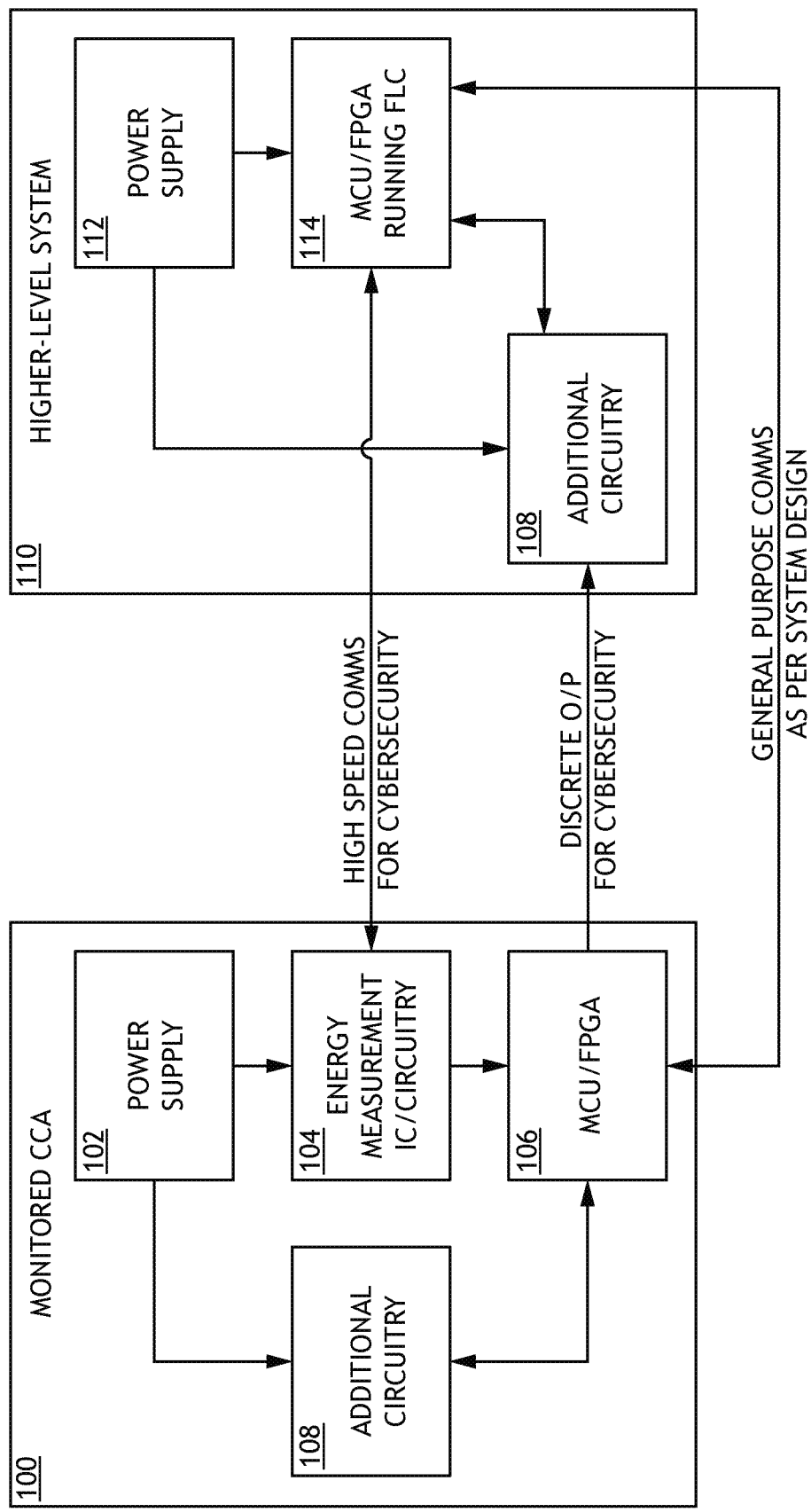
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for identifying compromised systems, even where cyber security measures are in place. A computer system continuously monitors system parameters against a set of predefined thresholds. If the system violates those thresholds, either instantaneously or over a period of time, the system determines that unknown processes are using the system; those processes may be unauthorized processes loaded via a successful spoof attack. The system may monitor CPU usage, power usage, temperature, memory access, data storage access, data transmission rates, etc. The system may execute some remedial action when unauthorized processes are suspected.

Referring to FIG. 1, a block diagram of a system according to an exemplary embodiment is shown. Embodiments of the present disclosure include a monitored circuit card assembly 100. The monitored circuit card assembly 100 may include a power supply 102 and microcontroller unit/field programmable gate array 106. During normal operation, the microcontroller unit/field programmable gate array 106 executes certain known operations; those operations require power from the power supply 102. Furthermore, those operations while have some task rate utilization that may be known to within some threshold.

In at least one embodiment, where the monitored circuit card assembly 100 is protected by standard challenge-response mechanisms, the monitored circuit card assembly 100 may be "spoofed" such that the challenge-response mechanisms are defeated and a modified code-image is loaded to the microcontroller unit/field programmable gate array 106. The modified code-image always has additional or modified code that executes passive or active attacks.

The modified image-code may draw power from the power supply 102 that deviates from an expected power draw as compared to the unmodified image-code. Alternatively, or in addition, the modified image-code may exhibit a task rate utilization that deviates from an expected task rate utilization as compared to the unmodified code-image. For example, an unmodified code-image may have a scheduler task rate utilization of 0.5 msec±some jitter. Any malicious code added via the modified code-image will require more time to execute, increasing the predetermined task rate utilization. If may be appreciated that an attach may wipe the unmodified code and replace it; in such case the power draw and/or task rate utilization may be less than expected.

In at least one embodiment, a monitoring system 110 including a power supply 112 and a microcontroller unit/field programmable gate array 114 is configured to monitor the task rate utilization and power draw of the monitored circuit card assembly 100. For example, the monitoring system 110 may include a timer 116 which would determine how long certain sections of code or tasks are running on the monitored microcontroller unit/field programmable gate array 106. The monitoring microcontroller unit/field programmable gate array 114 may compare the task rate utilization of the monitored microcontroller unit/field programmable gate array 106 against some predefined threshold.

In at least one embodiment, the monitoring microcontroller unit/field programmable gate array 114 is configured to monitor power usage of the monitored microcontroller unit/field programmable gate array 106. For example, the monitored microcontroller unit/field programmable gate array 106 may include some power measurement circuitry 104 to continuously monitor power drawn by the monitored microcontroller unit/field programmable gate array 106. The monitoring microcontroller unit/field programmable gate array 114 is configured to receive such measurements and compare them to some threshold.

Standard microcontroller units/field programmable gate arrays for modern day aerospace applications rely on 1.2V for core operation and 3.3V for I/O; energy consumption from both rails may be monitored. The measurement of energy consumed may be facilitated by use of energy measurement ICs. Alternatively, circuitry may be used to simultaneously monitor the rail voltage and current drawn from each rail to yield the power consumed. In such embodiments, the monitoring microcontroller unit/field programmable gate array 114 repeated samples and integrates the power being measured to determine the energy consumed in a predefined time period.

In at least one embodiment, the monitoring microcontroller unit/field programmable gate array 114 may monitor memory utilization or I/O utilization via additional circuitry 108.

In at least one embodiment, the monitoring microcontroller unit/field programmable gate array 114 may monitor instantaneous values for a short-term deviation. Alternatively, or in addition, the monitoring microcontroller unit/field programmable gate array 114 may monitor cumulative values over time or deviations over time to identify long-term deviations. The monitoring microcontroller unit/field programmable gate array 114 may maintain rolling averages of all monitored parameters to compare against instantaneous values. In any case, the monitoring microcontroller unit/field programmable gate array 114 may maintain thresholds for each parameter to compare short-term or long-term values. Thresholds may include some jitter to prevent false positives.

In at least one embodiment, the monitored circuit card assembly 100 may include additional circuitry 108 to monitor other parameters. For example, thermocouples may monitor the temperature of the monitored circuit card assembly 100 for deviations indicative of increased processor usage.

In at least one embodiment, the monitoring microcontroller unit/field programmable gate array 114 may receive several parameter measurements and produce a risk assessment. The monitoring microcontroller unit/field programmable gate array 114 may be configured according to machine learning algorithms, such as a neural network and fuzzy logic, to determine the risk assessment. Risk assessments may be as a numerical value, or a subjective value such as "low", "medium", or "high". In at least one embodiment, the monitoring microcontroller unit/field programmable gate array 114 may receive individual subjective parameter assessments (e.g., "task rate deviation high", "energy deviation medium").

Figure 3A:
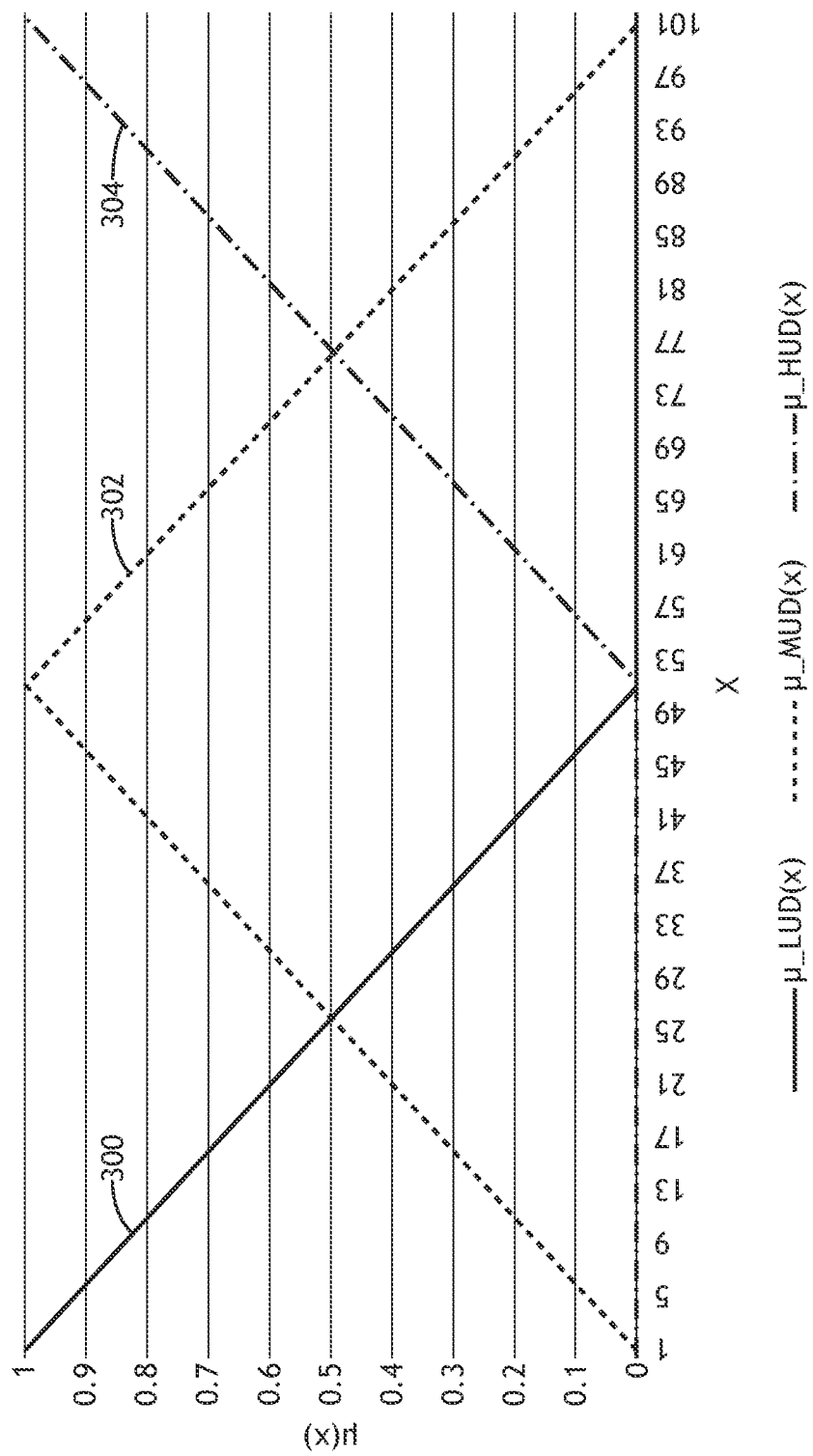
FIG. 3A shows a fuzzy logic membership function according to an exemplary embodiment.
Figure 3B:
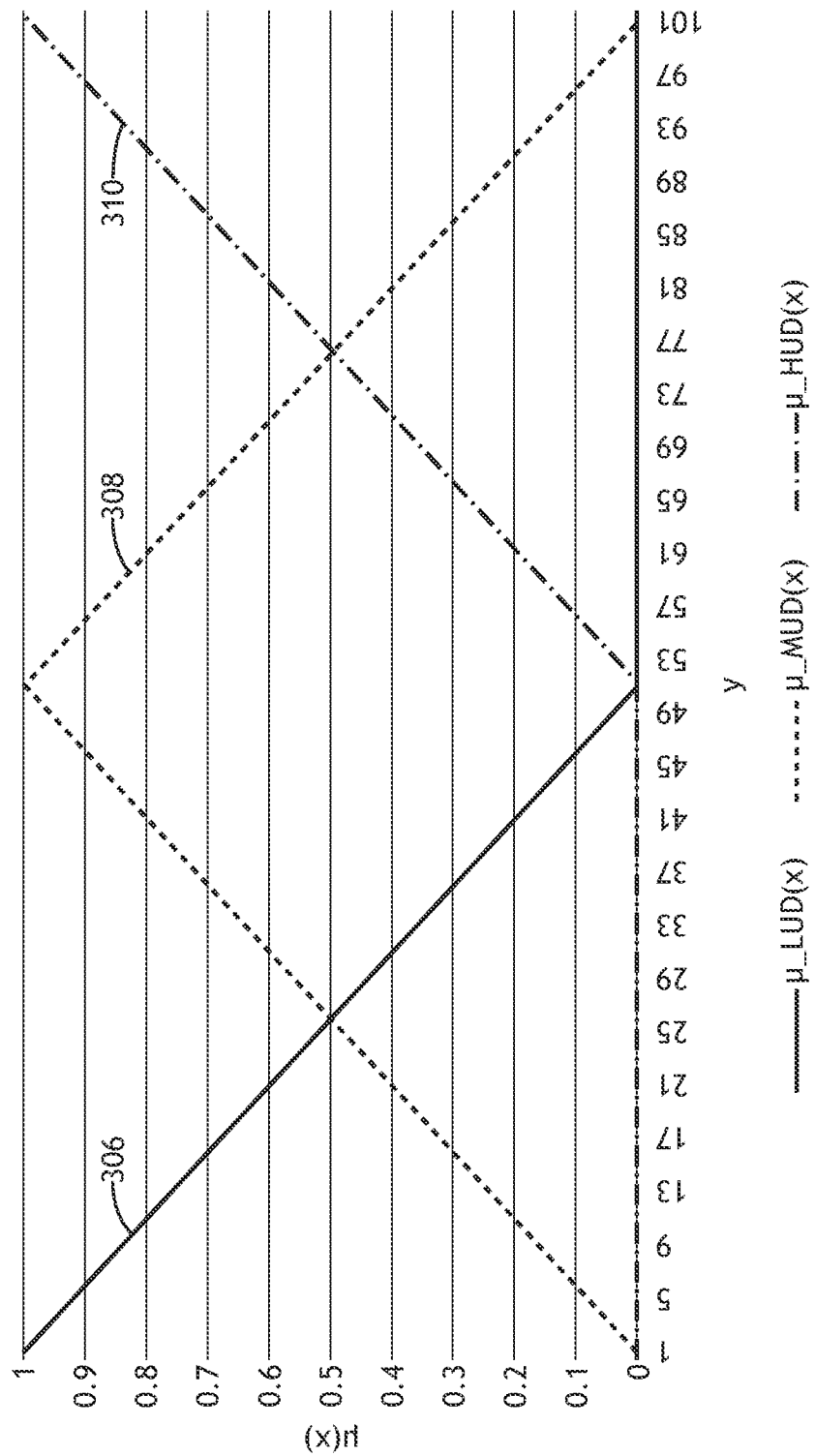
FIG. 3B shows a fuzzy logic membership function according to an exemplary embodiment.
Figure 3C:
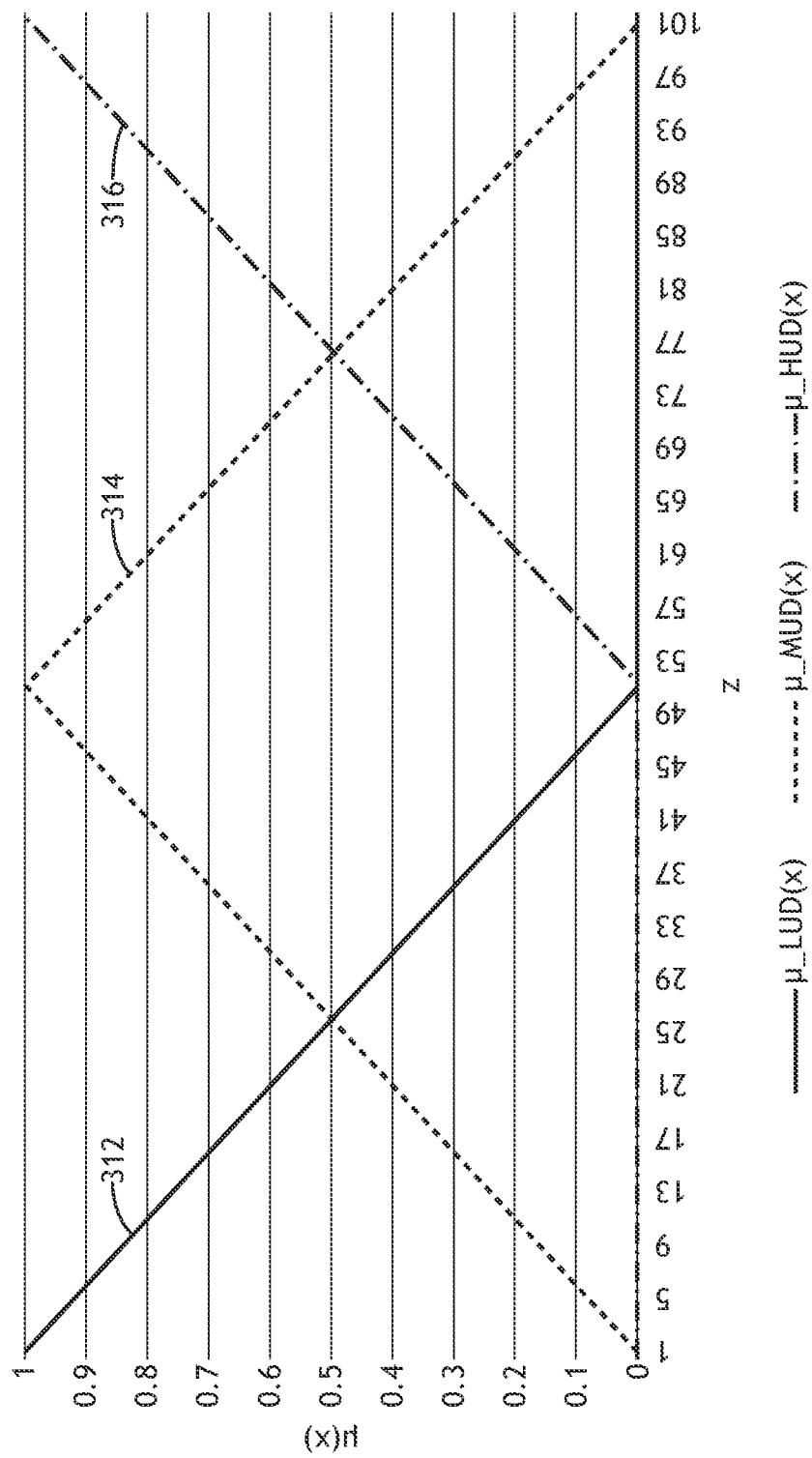
FIG. 3C shows a fuzzy logic membership function according to an exemplary embodiment.

Referring to FIGS. 3A-3C, fuzzy logic membership functions according to exemplary embodiments are shown. In one exemplary embodiment, fuzzy logic triangular membership functions may be used to establish relationships between parameter deviations and output values. Referring to FIG. 3A, for task rate utilization deviation x:

$$\mu_{LUD}(x) = \frac{50-x}{50}; \text{for } 0 \le x \le 50$$

$$\mu_{MUD}(x) = \frac{x}{50}; \text{for } 0 \le x < 50$$

$$\mu_{MUD}(x) = \frac{x}{50}; \text{for } 0 \le x < 50$$

$$\mu_{HUD}(x) = \frac{x-50}{50}; \text{for } 50 \le x \le 100$$

Where x is a task rate utilization deviation and LUD corresponds to a low deviation, MUD corresponds to a medium deviation, and HUD corresponds to a high deviation. Similar computations may be applied for energy usage deviation or any parameter deviation, and for determined risk level. Referring to FIG. 3B, for energy deviation y:

$$\mu_{LED}(y) = \frac{50-y}{50}; \text{for } 0 \le y \le 50$$

$$\mu_{MED}(y) = \frac{y}{50}; \text{for } 0 \le y < 50$$

$$\mu_{MED}(y) = 1 - \left(\frac{y-50}{50}\right); \text{for } 50 \le y < 100$$

$$\mu_{HED}(y) = \frac{y-50}{50}; \text{for } 50 \le y \le 100$$

Where y is an energy deviation and LED corresponds to a low deviation, MED corresponds to a medium deviation, and HED corresponds to a high deviation. Referring to FIG. 3C, for risk level z:

$$\mu_{LR}(z) = \frac{50-z}{50}; \text{for } 0 \le z \le 50$$

$$\mu_{MR}(z) = \frac{z}{50}; \text{for } 0 \le z < 50$$

$$\mu_{MR}(z) = 1 - \left(\frac{z-50}{50}\right); \text{for } 50 \le z < 100$$

$$\mu_{HR}(z) = \frac{z-50}{50}; \text{for } 50 \le z \le 100$$

Where z is a risk level and LR corresponds to a low risk, MR corresponds to a medium risk, and HR corresponds to a high risk.

The monitored microcontroller unit/field programmable gate array may apply some rule table to map risk level inputs to risk assessment outputs. Referring to FIG. 4, a rule table is shown. The table correlates input descriptors to output descriptors.

In at least one embodiment, the monitoring microcontroller unit/field programmable gate array may apply fuzzy logic to the inputs. In one example, where task rate utilization deviation x is measured at 20% and energy deviation y is measured at 90%, inputs may be calculated:

$$\mu_{LUD}(x) = \frac{50-20}{50} = 0.6$$

$$\mu_{MUD}(x) = \frac{20}{50} = 0.4$$

$$\mu_{MED}(y) = 1 - \frac{90-50}{50} = 0.2$$

$$\mu_{HED}(y) = \frac{90-50}{50} = 0.8$$

Referring to FIG. 5, a table of defuzzification is shown. All possible combinations of membership functions are listed: max(0.2, 0.6, 0.2, 0.4)=0.6 corresponds to LUD and HED. Referring to the table in FIG. 4, LUD and HED input descriptors correspond to the HR output descriptor.

Based on maximum and minimum values, the monitoring microcontroller unit/field programmable gate array may determine that the values (e.g., 0.6) correspond to a low utilization deviation and high energy deviation. Utilizing a representative membership function:

$$\mu_{HR}(z) = \frac{z-50}{50} = 0.6$$

$$z = 80\%$$

Thus, the monitoring microcontroller unit/field programmable gate array 114 may determine an 80% risk level.

Figure 2:
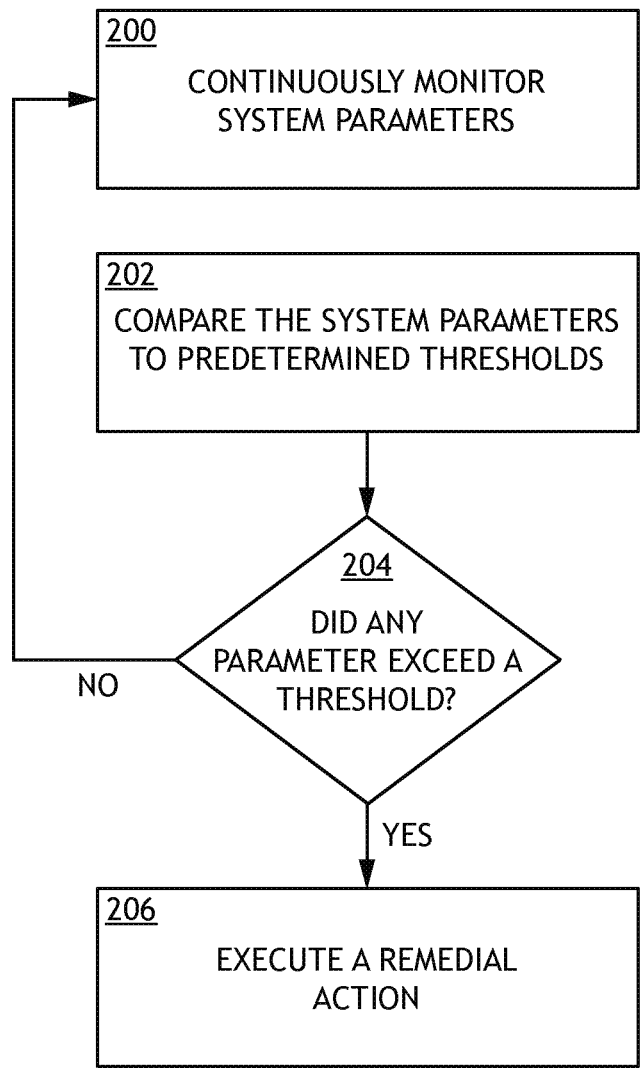
FIG. 2 shows a flowchart of a method for monitoring a system according to an exemplary embodiment.

Referring to FIG. 2, a flowchart of a method for monitoring a system according to an exemplary embodiment is shown. A monitoring microcontroller unit/field programmable gate array continuously monitors 200 certain system parameters of a monitored microcontroller unit/field programmable gate array. Those parameters may include energy usage and task rate utilization, and other ancillary features such as temperature, memory utilization, I/O utilization or the like. The monitoring microcontroller unit/field programmable gate array compares 202 the system parameters to some predetermine thresholds. Those thresholds may be embodied in fuzzing functions that convert parameter deviations into low, medium, and high deviation/risk values.

If the monitoring microcontroller unit/field programmable gate array determines 204 that none of the parameters exceeds a threshold, or that the overall risk assessment is below some threshold, the monitoring microcontroller unit/field programmable gate array just continues to continuously monitor 200 system parameters.

If the monitoring microcontroller unit/field programmable gate array determines 204 that some parameter exceeds a threshold, or that the overall risk assessment is above some threshold, the monitoring microcontroller unit/field programmable gate array may execute 206 some remedial action, such as reporting the elevated risk, switching to a backup system, or the like.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
    a monitored processor; and
    at least one monitoring processor configured to:
        continuously receive one or more parameter values, each corresponding to an operating parameter of the monitored processor, at least one corresponding to a task rate utilization and at least one corresponding to an energy utilization;
        compare the one or more parameter values to a corresponding threshold;
        determine if the one or more parameter values exceeds the corresponding threshold;
        produce a risk assessment; and determine a weighted risk assessment based on the energy utilization and the task rate utilization.

2. The computer apparatus of claim 1, wherein the computer apparatus further comprises an energy measurement integrated circuit configured to measure energy utilization on more than one power rail.

3. The computer apparatus of claim 1, wherein the at least one monitoring processor is further configured to execute a remedial action when the risk assessment exceeds a threshold.

4. The computer apparatus of claim 1, wherein the one or more parameters comprises a temperature, an I/O utilization rate, and a memory utilization rate.

5. A computer implemented method comprising:
   continuously receiving one or more parameter values, each corresponding to an operating parameter of a monitored processor, at least one corresponding to a task rate utilization and at least one corresponding to an energy utilization;
   comparing the one or more parameter values to a corresponding threshold;
   determining if the one or more parameter values exceeds the corresponding threshold;
   producing a risk assessment; and
   determining a weighted risk assessment based on the energy utilization and the task rate utilization.

6. The method of claim 5, further comprising measuring energy utilization on more than one power rail.

7. The method of claim 5, further comprising executing a remedial action when the risk assessment exceeds a threshold.

8. A system comprising:
   a monitored processor; and
   at least one monitoring processor configured to:
      continuously receive one or more parameter values, each corresponding to an operating parameter of the monitored processor, at least one corresponding to a task rate utilization and at least one corresponding to an energy utilization;
      compare the one or more parameter values to a corresponding threshold;
      determine if the one or more parameter values exceeds the corresponding threshold;
      produce a risk assessment; and
      determine a weighted risk assessment based on the energy utilization and the task rate utilization.

9. The system of claim 8, wherein the system further comprises an energy measurement integrated circuit configured to measure energy utilization on more than one power rail.

10. The system of claim 8, wherein the at least one monitoring processor is further configured to execute a remedial action when the risk assessment exceeds a threshold.

11. The system of claim 8, wherein the one or more parameters comprises a temperature, an I/O utilization rate, and a memory utilization rate.

\* \* \* \* \*